(12) United States Patent
Yoon et al.

(10) Patent No.: US 12,514,851 B2
(45) Date of Patent: Jan. 6, 2026

(54) USE OF 2,3,5-SUBSTITUTED THIOPHENE COMPOUND FOR PREVENTING, AMELIORATING, OR TREATING OVARIAN CANCER

(71) Applicant: PHAROS IBIO CO., LTD, Anyang-si (KR)

(72) Inventors: Jeong Hyeok Yoon, Yongin-Si (KR); Ky Youb Nam, Goyang-Si (KR)

(73) Assignee: PHAROS IBIO CO., LTD., Gyeonggi-Do (KR)

( * ) Notice: Subject to any disclaimer, the term of this patent is extended or adjusted under 35 U.S.C. 154(b) by 671 days.

(21) Appl. No.: 17/905,510

(22) PCT Filed: Mar. 4, 2021

(86) PCT No.: PCT/KR2021/002649
§ 371 (c)(1),
(2) Date: Sep. 2, 2022

(87) PCT Pub. No.: WO2021/177728
PCT Pub. Date: Sep. 10, 2021

(65) Prior Publication Data
US 2023/0293507 A1    Sep. 21, 2023

(30) Foreign Application Priority Data

Mar. 4, 2020   (KR) .................. 10-2020-0027448
Mar. 3, 2021   (KR) .................. 10-2021-0028261

(51) Int. Cl.
*A61K 31/4535* (2006.01)
*A61K 31/337* (2006.01)
*A61K 31/4745* (2006.01)
*A61K 31/502* (2006.01)
*A61K 33/243* (2019.01)
*A61P 35/00* (2006.01)

(52) U.S. Cl.
CPC ........ *A61K 31/4535* (2013.01); *A61K 31/337* (2013.01); *A61K 31/4745* (2013.01); *A61K 31/502* (2013.01); *A61K 33/243* (2019.01); *A61P 35/00* (2018.01)

(58) Field of Classification Search
CPC .............. A61K 31/4535; A61K 31/337; A61K 31/4745; A61K 31/502; A61P 35/00
See application file for complete search history.

(56) References Cited

U.S. PATENT DOCUMENTS

| 11,938,123 | B2 * | 3/2024 | Yoon .................. A61K 31/4184 |
| 2023/0263792 | A1 * | 8/2023 | Sim ........................ A61P 29/00 |
| | | | 514/326 |
| 2023/0270733 | A1 * | 8/2023 | Sim ........................ A23L 33/10 |
| | | | 514/326 |

FOREIGN PATENT DOCUMENTS

| CA | 3014740 A1 * | 8/2017 | .......... A61K 31/381 |
| JP | 2019504900 A | 2/2019 | |
| KR | 20060080918 A | 7/2006 | |
| KR | 20060127127 A | 12/2006 | |
| KR | 20170096599 A | 8/2017 | |
| KR | 102028848 B1 | 10/2019 | |
| KR | 20190124668 A | 11/2019 | |
| KR | 20190136976 A | 12/2019 | |
| WO | 2011035077 A1 | 3/2011 | |

OTHER PUBLICATIONS

ClevelandClinic—Ovarian Cancer, https://my.clevelandclinic.org/health/diseases/4447-ovarian-cancer, Available online: Nov. 14, 2022. (Year: 2022).*
International Search Report corresponding to PCT/KR2021/002649; dated Jun. 24, 2021 (10 pages, including English translation).
Extended European Search Report corresponding to EP Application No. 21764422.8; dated Mar. 12, 2024 (8 pages).
Itamochi, Hiroaki, et al., "Checkpoint Kinase Inhibitor AZD7762 Overcomes Cisplatin Resistance in Clear Cell Carcinoma of the Ovary", International Journal of Gynecological Cancer 24(1): 61-69, 2013.
Zabludoff, Sonya D., et al., "AZD7762, a novel checkpoint kinase inhibitor, drives checkpoint abrogation and potentiates DNA-targeted therapies", Molecular Cancer Therapeutics 7(9): 2955-2966, 2008.
Japanese Office Action corresponding to JP 2022-553164; dated Aug. 7, 2023 (6 pages, including English translation).
Katsumata, Noriyuki, "Molecular Targeted Therapy", Journal of the Japanese Society of Obstetrics and Gynecology. vol. 60, No. 9, 2008, 191-198 (Cited document 2 in the JP Action).
Shimohira, Hideki, "BRCA mutant breast cancer ovarian cancer and PARP inhibitors", Familial Tumors. vol. 17, No. 2, 2017, 46-49 (Cited document 4 in the JP Action).
Terauchi, Fumitoshi, et al., "Frontline of Ovarian Cancer Treatment", Abstracts of the 160th General Meeting of the Medical Society, Tokyo Medical University Journal. vol. 66, No. 1, 2008, 153-156 (Cited document 3 in the JP Action).

* cited by examiner

*Primary Examiner* — Joseph K McKane
*Assistant Examiner* — Sagar Patel
(74) *Attorney, Agent, or Firm* — Wenderoth, Lind & Ponack, L.L.P.

(57) ABSTRACT

The present invention relates to a composition for preventing, ameliorating, or treating ovarian cancer, the composition containing a 2,3,5-substituted thiophene compound. The composition has excellent inhibitory activity against the proliferation of ovarian cancer, and thus may be effectively used for preventing, ameliorating, or treating ovarian cancer.

6 Claims, 12 Drawing Sheets

|   | 1 | 2 | 3 | 4 | 5 | 6 | 7 | 8 | 9 | 10 | 11 | 12 |
|---|---|---|---|---|---|---|---|---|---|----|----|----|
| A |   |   |   |   |   |   |   |   |   |    |    |    |
| B |   |   |   |   |   |   |   |   |   |    |    |    |
| C |   |   |   |   | Medium |   |   |   |   |    |    |    |
| D |   |   |   |   |   |   |   |   |   |    |    |    |
| E |   |   |   |   | CoA PHI-101 |   |   |   |   |    |    |    |
| F |   |   |   |   |   |   |   |   |   |    |    |    |
| G |   |   |   |   | CoA PHI-101 |   |   |   |   |    |    |    |
| H |   |   |   |   |   |   |   |   |   |    |    |    |

FIG.5

|   | 1 | 2 | 3 | 4 | 5 | 6 | 7 | 8 | 9 | 10 | 11 | 12 |
|---|---|---|---|---|---|---|---|---|---|----|----|----|
| A |   |   |   |   |   |   |   |   |   |    |    |    |
| B |   |   |   |   |   | Olaparib |   |   |   |    |    |    |
| C |   |   |   |   |   |          |   |   |   |    |    |    |
| D |   |   |   |   |   | Medium   |   |   |   |    |    |    |
| E |   |   |   |   |   |          |   |   |   |    |    |    |
| F |   |   |   |   |   | Olaparib |   |   |   |    |    |    |
| G |   |   |   |   |   |          |   |   |   |    |    |    |
| H |   |   |   |   |   |   |   |   |   |    |    |    |

A

B

C

A

B

A

B

A

B

USE OF 2,3,5-SUBSTITUTED THIOPHENE COMPOUND FOR PREVENTING, AMELIORATING, OR TREATING OVARIAN CANCER

CROSS REFERENCE TO RELATED APPLICATIONS

This application is a 35 U.S.C. § 371 national stage application of PCT International Application No. PCT/KR2021/002649, filed Mar. 4, 2021, which claims priority from Korean Patent Application No. 10-2020-0027448, filed Mar. 4, 2020, and claims priority from Korean Patent Application No. 10-2021-0028261, filed Mar. 3, 2021, the contents of which are incorporated herein in their entireties by reference. The above-referenced PCT International Application was published in the Korean language as International Publication No. WO 2021/177728A1 on Sep. 10, 2021.

TECHNICAL FIELD

The present invention relates to the use of a 2,3,5-substituted thiophene compound for preventing, ameliorating or treating ovarian cancer.

BACKGROUND ART

Ovarian cancer is the most lethal gynecologic cancer, with 22,000 new enrolled patients and 15,000 deaths in 2008 in the United States (Jemal et al., 2008). For ovarian cancer in the United States in 2017, 22,400 new patients were enrolled, and 14,000 deaths occurred, which correspond to 2.3% of the patients dying from cancer. The mortality rate from ovarian cancer decreased by 10% in 28 European countries in 2002 to 2012, and decreased by 16% in the United States during the same period.

In all stages of ovarian cancer (stage I-IV), treatment is initiated by surgery, but only a small percentage of ovarian cancer patients are operable. More than 70% of ovarian cancer patients have advanced stage III or higher ovarian cancer. In the United States in 2014, the 5-year survival rate at all stages of ovarian cancer was 46%, and it was 92% in the case of local ovarian cancer and decreased rapidly to 29% in the metastatic stage. Adjuvant chemotherapy such as cisplatin or paclitaxel is applied to advanced patients after surgery, and in more than 70% of cases in the initial stage, combination therapy with platinum and taxane effectively resulted in clinical complete remission, as evidenced by serum CA-125 levels and imaging with CT scan.

Despite this clinical complete remission, the 5-year survival rate is low, that is, less than 25% for stage III, and less than 10% for stage IV (McGuire et al., 1996). Because of resistance to chemotherapy, most ovarian cancer patients die after recurrence.

Due to the limitations of general chemotherapeutic agents in the treatment of ovarian cancer, bevacitumab, which targets the angiogenesis inhibitory signaling pathway, was developed, which showed improvement in clinical efficacy and exhibited a response rate of 18% in patients with recurrent ovarian cancer (Burger et al., 2007; Cannistra et al., 2007).

It is known that, in ovarian cancer patients, the degree of mutation in gemline BRCA1 and BRCA2 genes is about 8 to 18%, and is particularly higher in the case of specific Jews. BRCA1/2 mutation affects BRCA1/2 function and homologous recombination, and somatic BRCA1/2 mutation was found in 5% of ovarian cancer patients. The overall response rate to Olaparib was observed to be 23.9% in phase 2 clinical trial of Olaparib performed on 46 patients with advanced serous ovarian cancer and TNBC patients (Gelmon et al., 2010).

Currently, existing ovarian cancer therapeutic agents have significant side effects and show a low 5-year survival rate due to ovarian cancer recurrence by metastasis. Thus, there is a need to develop a new drug that, when used in combination with existing therapeutic agents, has less additional toxicity and can improve the survival rate of ovarian cancer patients by suppression of ovarian cancer metastasis. Therefore, there is an urgent need to develop a drug that satisfies the two factors (having no additional toxicity and excellent metastasis inhibition efficacy) through new drug development targeting ovarian cancer.

Accordingly, the present inventors have conducted studies to develop an effective therapeutic agent for the treatment of ovarian cancer, thereby completing the present invention.

DISCLOSURE

Technical Problem

An object of the present invention is to provide the use of a compound represented by the following Formula 1 or a pharmaceutically acceptable salt thereof, for preventing, ameliorating or treating ovarian cancer:

[Formula 1]

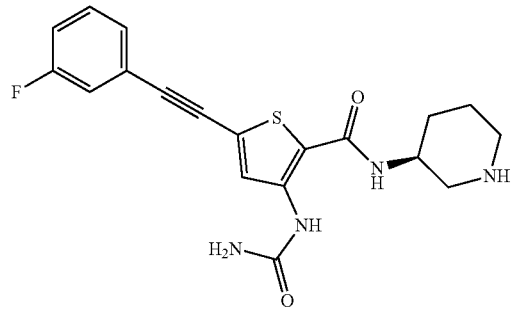

Technical Solution

The present invention provides a pharmaceutical composition for preventing or treating ovarian cancer, the pharmaceutical composition containing a compound represented by the following Formula 1 or a pharmaceutically acceptable salt thereof:

[Formula 1]

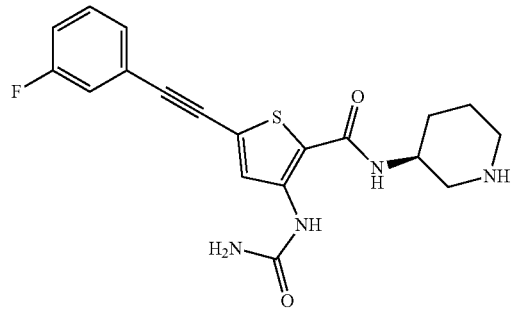

In one embodiment of the present invention, the ovarian cancer may be any one of TP53-mutant ovarian cancer, recurrent epithelial peritoneal or fallopian tube cancer, and high-grade serous ovarian cancer.

In one embodiment of the present invention, the composition may further contain at least one anticancer agent selected from the group consisting of cisplatin, paclitaxel, and topotecan.

In one embodiment of the present invention, the composition may further contain olaparib.

Another aspect of the present invention provides a food composition for preventing or ameliorating ovarian cancer, the food composition containing a compound represented by the following Formula 1 or a pharmaceutically acceptable salt thereof:

[Formula 1]

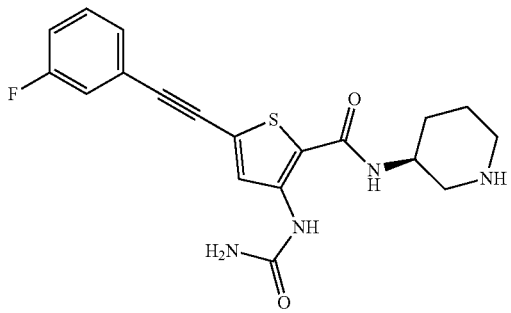

In one embodiment of the present invention, the ovarian cancer may be any one of TP53-mutant ovarian cancer, recurrent epithelial peritoneal or fallopian tube cancer, and high-grade serous ovarian cancer.

Advantageous Effects

The composition for preventing, ameliorating or treating ovarian cancer comprising a 2,3,5-substituted thiophene compound according to an embodiment of the present invention has excellent proliferation inhibitory activity against ovarian cancer, and thus may be effectively used for the prevention, amelioration or treatment of ovarian cancer.

BRIEF DESCRIPTION OF DRAWINGS

FIG. 4 shows the 96-well plate arrangement of serially diluted PHI-101.

FIG. 5 shows the 96-well plate arrangement of serially diluted olaparib.

BEST MODE

Figure 1:
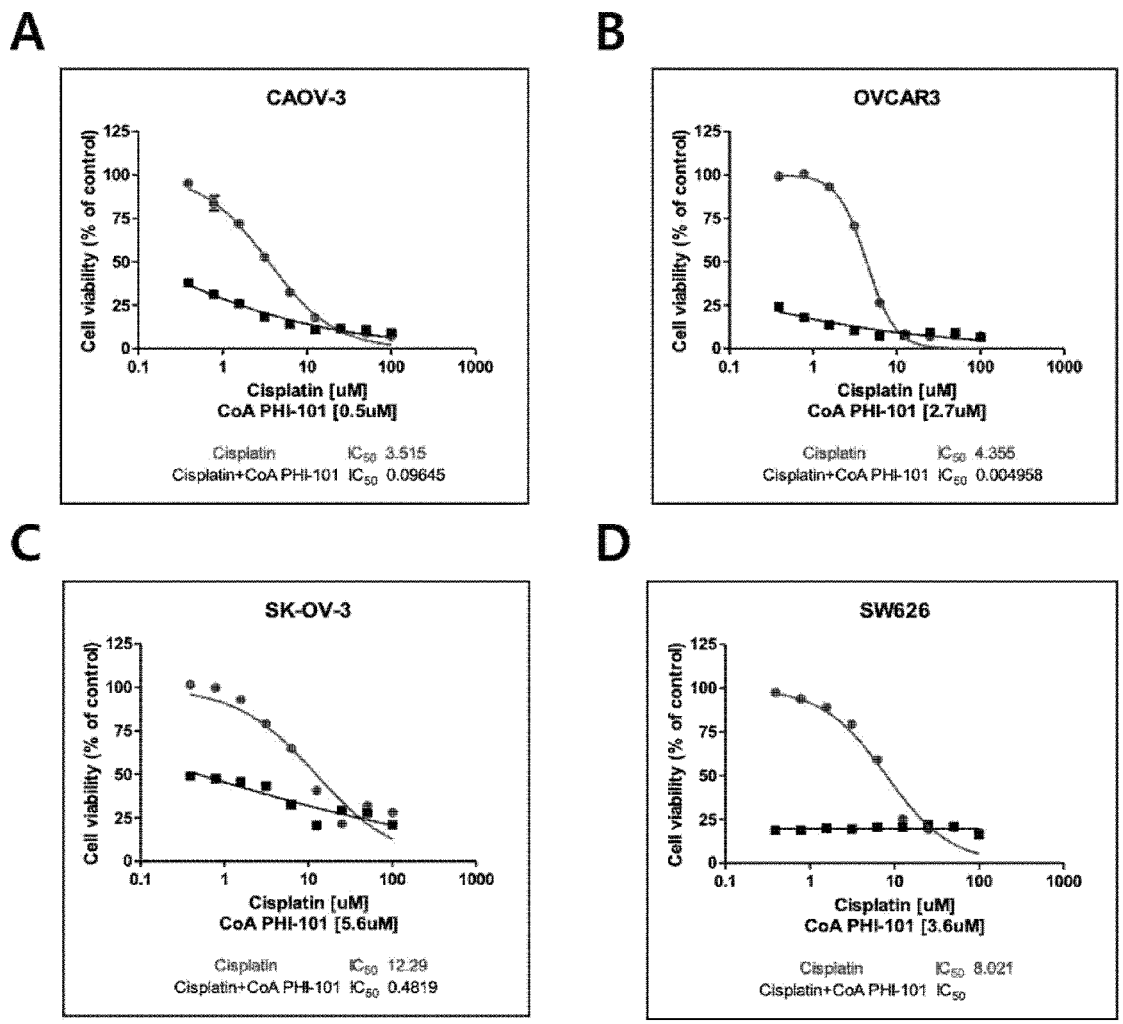
FIG. 1 depicts graphs showing the $IC_{50}$ values of cisplatin and a combination of cisplatin and PHI-101 against CAOV3 (A), OVCAR3 (B), SK-OV-3 (C) and SW626 (D) ovarian cell lines.

One aspect of the present invention provides a pharmaceutical composition for preventing or treating ovarian cancer, the pharmaceutical composition containing a compound represented by the following Formula 1 or a pharmaceutically acceptable salt thereof:

[Formula 1]

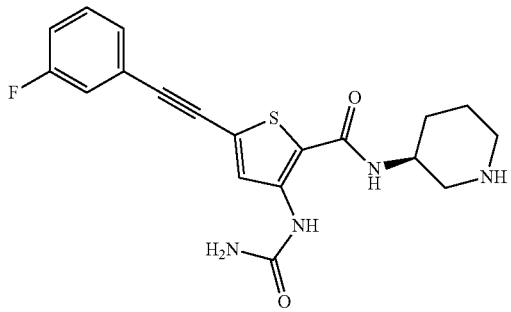

The compound represented by Formula 1, which is contained as an active ingredient in the pharmaceutical composition of the present invention, is (S)-5-((3-fluorophenyl)ethynyl)-N-(piperidin-3-yl)-3-ureido thiophene-2-carboxamide).

In one embodiment of the present invention, the ovarian cancer may be any one of TP53-mutant ovarian cancer, recurrent epithelial peritoneal or fallopian tube cancer, and high-grade serous ovarian cancer.

The compound represented by Formula 1 has excellent inhibitory ability against ovarian cancer, particularly TP53-mutant ovarian cancer among ovarian cancers.

In one embodiment of the present invention, the composition may further contain at least one anticancer agent selected from the group consisting of cisplatin, paclitaxel, and topotecan.

In one embodiment of the present invention, the composition may further contain olaparib.

This compound may be used alone or in combination with existing anticancer agents such as cisplatin, paclitaxel, topotecan and/or olaparib. When the compound is used in combination with existing anticancer agents, it can significantly enhance the ovarian cancer treatment effect of the existing anticancer agents.

Cisplatin is an anticancer agent widely used in the treatment of testicular cancer, ovarian cancer, lung cancer, head and neck cancer, bladder cancer, stomach cancer and cervical cancer, but is often accompanied by side effects such as hematopoietic toxicity such as anemia, digestive toxicity such as vomiting or nausea, renal toxicity such as kidney tubule damage, hearing loss, electrolyte abnormalities in the body, shock, and peripheral nerve abnormalities. Paclitaxel is a representative anticancer agent for ovarian cancer, but it is accompanied by side effects such as hair loss, gastrointestinal disorders, nausea, vomiting, numbness in the hands and feet, and allergic reactions. Topotecan is an anticancer agent used for widespread ovarian cancer, small cell lung cancer, lymphoma, acute myeloid leukemia, advanced cervical cancer, etc., but it is accompanied by side effects such as leukopenia due to myelosuppression, thrombocytopenia, hair loss, respiratory disorders, etc. Olaparib is a targeted anticancer agent that targets PARP, but it is accompanied by side effects such as nausea, anemia, fatigue, vomiting, neutropenia, respiratory infection, leukopenia, diarrhea, and headache.

It was confirmed that, when the compound represented by Formula 1 according to the present invention was used in combination with cisplatin, paclitaxel, topotecan and/or olaparib, the inhibitory effect against ovarian cancer significantly increased compared to that when each of the anticancer agents was used alone. Thus, the existing anticancer agents used for the treatment of ovarian cancer may be administered at lower concentrations than when they are used alone, so that the occurrence of side effects caused by each anticancer agent described above may be reduced. Accordingly, the compound represented by Formula 1 according to the present invention may be effectively used in combination with the existing anticancer agents for the prevention or treatment of ovarian cancer.

In addition, when the compound represented by Formula 1 according to the present invention is co-administered with olaparib, it exhibits a synergistic effect, suggesting that it may be particularly effectively used in combination with olaparib.

The pharmaceutical composition according to one embodiment of the present invention may be used alone or in combination with surgery, hormone therapy, drug therapy, radiation therapy and/or methods that use biological response modifiers, for the treatment of ovarian cancer.

The pharmaceutical composition of the present invention may contain a pharmaceutically acceptable carrier. Examples of the pharmaceutically acceptable carrier contained in the pharmaceutical composition of the present invention include, but are not limited to, lactose, dextrose, sucrose, sorbitol, mannitol, starch, gum acacia, calcium phosphate, alginate, gelatin, calcium silicate, microcrystalline cellulose, polyvinylpyrrolidone, cellulose, water, syrup, methyl cellulose, methylhydroxybenzoate, propylhydroxybenzoate, talc, magnesium stearate and mineral oil, which are commonly used in the manufacture of medicaments. The pharmaceutical composition of the present invention may further contain a lubricant, a wetting agent, a sweetening agent, a flavoring agent, an emulsifying agent, a suspending agent, a preservative, and the like, in addition to the above-described components. Suitable pharmaceutically acceptable carriers and formulations are described in detail in *Remington: the science and practice of pharmacy* 22nd edition (2013).

The pharmaceutical composition of the present invention may include various bases and/or additives necessary and suitable for formulation thereof, and may be prepared to further contain known components such as a nonionic surfactant, a silicone polymer, an extender pigment, a fragrance, an antiseptic agent, a disinfectant, an oxidation stabilizer, an organic solvent, an ionic or nonionic thickener, a softener, an antioxidant, a free radical destruction agent, an opacifier, a stabilizer, an emollient, silicone, α-hydroxy acid, an antifoaming agent, a moisturizer, a vitamin, an insect repellent, a fragrance, a preservative, a surfactant, an anti-inflammatory agent, a substance P antagonist, a filler, a polymer, a propellant, a basifying or acidifying agent, or a coloring agent, within a range that does not impair the effect thereof.

A suitable dose of the pharmaceutical composition of the present invention may vary depending on factors such as formulation method, administration mode, the patient's age, body weight, sex, disease condition and diet, administration duration, administration route, excretion rate and response sensitivity. The dose of the pharmaceutical composition of the present invention may be 0.001 to 1,000 mg/kg for an adult.

The pharmaceutical composition of the present invention may be administered orally or parenterally.

The pharmaceutical composition of the present invention may be administered orally in various forms, including tablets, pills, hard or soft capsules, solutions, suspensions, emulsions, syrups, granules, elixirs, troches, etc., and may further contain various excipients, for example, wetting agents, sweetening agents, flavoring agents, preservatives, and the like. Specifically, when the composition of the present invention is formulated in an oral dosage form, it may further contain appropriate carriers, excipients and diluents, which are commonly used for formulation. As the carriers, excipients and diluents, for example, lactose, dextrose, sucrose, sorbitol, mannitol, xylitol, erythritol, maltitol, starch, gum acacia, alginate, gelatin, calcium phosphate, calcium silicate, cellulose, methyl cellulose, microcrystalline cellulose, polyvinylpyrrolidone, water, methylhydroxybenzoate, propylhydroxybenzoate, talc, magnesium stearate and/or mineral oil, may be used, but the examples thereof are not limited thereto. In addition, the composition may be prepared to contain fillers, extenders, binders, wetting agents, disintegrants, diluents such as surfactants, or excipients, which are generally used for formulation, and may further contain lubricants such as magnesium stearate or talc, in addition to the excipients.

The pharmaceutical composition of the present invention may be administered parenterally, for example, through a method such as subcutaneous injection, intravenous injection, intramuscular injection, or intrathoracic injection, without being limited thereto.

Formulation into a dosage form for parenteral administration may be performed, for example, by mixing the pharmaceutical composition of the present invention with a stabilizer or buffer in water to prepare a solution or suspension, which may be prepared in a unit dosage form of an ampoule or vial. In addition, the composition may be sterilized, and may further contain adjuvants such as preservatives, stabilizers, hydrating agents or emulsification accelerators, salts and buffers for controlling osmotic pressure, as well as other therapeutically useful substances, and may be formulated by a conventional method.

Another aspect of the present invention provides a method for treating ovarian cancer comprising a step of administering, to an ovarian cancer patient, a composition containing the compound represented by Formula 1 as an active ingredient.

The pharmaceutical composition according to one embodiment of the present invention contains the compound represented by Formula 1 as an active ingredient, and exhibits excellent anticancer effect against ovarian cancer, particularly TP53-mutant ovarian cancer. Therefore, the method may further comprise, before administering the pharmaceutical composition of the present invention, a companion diagnosis step of selecting a group of patients on whom the compound represented by Formula 1 exhibits an effect. This step may be performed by the TP53-mutant ovarian cancer diagnosis method known in the art.

As used herein, the term "companion diagnosis" refers to diagnosis for predicting the patient's response to specific drug treatment.

Another aspect of the present invention provides a food composition for preventing or ameliorating ovarian cancer, the food composition containing a compound represented by the following Formula 1 or a pharmaceutically acceptable salt thereof:

[Formula 1]

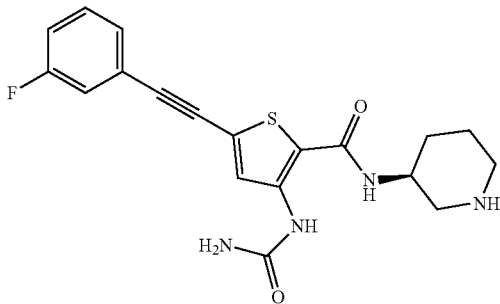

The food composition of the present invention may be prepared by adding raw materials and ingredients that are commonly added in the art, and may contain, in addition to the compound represented by Formula 1 as an active ingredient, various flavorings and natural carbohydrates as additional ingredients, like conventional food compositions.

According to one embodiment of the present invention, examples of the natural carbohydrates include conventional sugars, such as monosaccharides (e.g., glucose, fructose, etc.), disaccharides (e.g., maltose, sucrose, etc.), and polysaccharides (e.g., dextrin, cyclodextrin, etc.), and sugar alcohols such as xylitol, sorbitol, erythritol or the like. Examples of the flavorings include natural flavorings (thaumatin), stevia extracts (e.g., rebaudioside A, glycyrrhizin, etc.), and/or synthetic flavorings (saccharin, aspartame, etc.).

The food composition of the present invention contain may further contain at least one food-acceptable or pharmaceutically acceptable carrier for formulation, in addition to the active ingredient described above. The dosage form of the food composition may be a tablet, capsule, powder, granule, liquid, pill, solution, syrup, juice, suspension, emulsion or drop formulation. For example, for formulation in the form of tablet or capsule, the active ingredient may be combined with an oral, nontoxic pharmaceutically acceptable inert carrier such as ethanol, glycerol and water.

The food composition of the present invention may contain a vitamin mixture composed of vitamin A acetate, vitamin E, vitamin B1, vitamin B2, vitamin B6, vitamin B12, vitamin C, biotin, nicotinic acid amide, folic acid, and calcium pantothenate, and one or more minerals such as ferrous sulfate, zinc oxide, magnesium carbonate, potassium phosphate monobasic, potassium phosphate dibasic, potassium citrate, calcium carbonate, and magnesium chloride, which may be commonly added in the art.

If necessary, a suitable binder, lubricant, disintegrant and coloring agent may also be contained as a mixture. Examples of the suitable binders include natural sugars such as starch, gelatin, glucose or beta-lactose, natural and synthetic gums such as corn sweeteners, gum acacia, tragacanth or sodium oleate, sodium stearate, magnesium stearate, sodium benzoate, sodium acetate, sodium chloride, and the like. Examples of the disintegrants include starch, methyl cellulose, agar, bentonite, xanthan gum, and the like.

These components may be used independently or in combination, and the content of these additives may be selected within a range of 0 to about 20 parts by weight per 100 parts by weight of the food composition of the present invention, without being limited thereto.

Meanwhile, it is possible to prepare a variety of foods by applying various formulation preparation methods, known to those skilled in the art, to the food composition of the present invention. For example, the food composition of the present invention may be prepared as common health functional food formulations such as beverages, pills and powders, without being limited thereto.

In one embodiment of the present invention, the ovarian cancer may be any one of TP53-mutant ovarian cancer, recurrent epithelial peritoneal or fallopian tube cancer, and high-grade serous ovarian cancer.

The food composition of the present invention has particularly excellent ability to inhibit the proliferation of TP53-mutant ovarian cancer cell lines, and thus may be effectively used for the prevention or amelioration of TP53-mutant ovarian cancer.

MODE FOR INVENTION

Hereinafter, the present invention will be described in more detail with reference to one or more examples. However, these examples are to describe the present invention by way of example, and the scope of the present invention is not limited to these examples.

Example 1. Culture and Dilution of Ovarian Cancer Cell Lines

In 100-mm culture dishes (SPL) at 37° C. under 5% $CO_2$, the CAOV3 ovarian cancer cell line was cultured using DMEM (Dulbeco's Modified Eagle Medium), and the OVCAR3, SK-OV-3 and SW626 ovarian cancer cell lines were cultured using RPMI1640 medium. Thereafter, each cell line was diluted to 3,000 cells/80 μl using PBS (phosphate-buffered saline) (Biosesang).

Example 2. Evaluation of Inhibitory Activity of PHI-101 Against Ovarian Cancer Cell Lines 1-1. Evaluation of Inhibitory Activity Against Ovarian Cancer Cell Lines 90 μl of each ovarian cancer cell line diluted in Example 1 was treated with 10 μl of a 1:2 serial dilution of each of the compound represented by Formula 1 (hereinafter referred to as "PHI-101"), cisplatin, paclitaxel, prexasertib, and topotecan at a treatment starting concentration of 100 μM, and incubated at 37° C. under 5% $CO_2$ for 72 hours. After incubation, the cells were counted using a Celltiter glo assay kit (Promega), and cell viability was measured by expressing the cell count as a percentage relative to that of a control group not treated with PHI-101 or the anticancer agent.

[Formula 1]

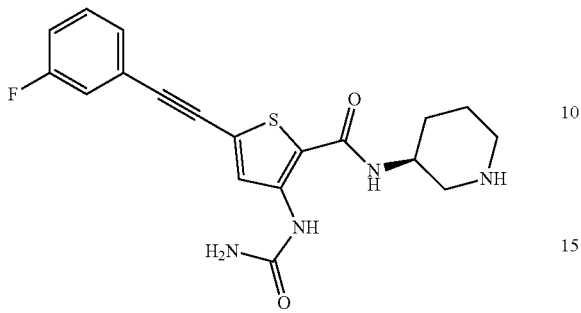

As a result of calculating the $IC_{50}$ value by sigmoidal curve fitting using the PRIZM software, it was confirmed that the $IC_{50}$ of each anticancer agent alone for each ovarian cancer cell line was as shown in Table 1 below, suggesting that PHI-101 had better inhibitory ability than the existing anticancer agents against the ovarian cancer cell lines.

TABLE 1

| Ovarian cancer cell line | $IC_{50}$ (μM) | | | | | |
|---|---|---|---|---|---|---|
| | PHI-101 | Cisplatin | Paclitaxel | Olaparib | Prexasertib | Topotecan |
| CAOV3 | 0.5 | 3.5 | 3.6 | 59.74 | — | 3.9 |
| OVCAR3 | 2.7 | 4.4 | 5.7 | 96.51 | 6.3 | 8.3 |
| SK-OV3 | 5.6 | 12.3 | 113.6 | 114.1 | — | 3.7 |
| SW626 | 3.6 | 8.0 | 29.8 | 147.2 | — | 14.4 |

1-2. Evaluation of Selective Inhibitory Activity Against TP53-Mutant Ovarian Cancer Cell Lines In order to evaluate the selective inhibitory activity of PHI-101, the characteristics of each cell line and the inhibitory activity of PHI-101 against ovarian cancer cell lines were investigated as shown in Table 2 below.

TABLE 2

| Ovarian cancer cell line | PHI-101 $IC_{50}$(μM) | EGFR Expression | ER Expression | CCNE1 | TP53 Mutation | PI3K Mutation | BRCA Mutation |
|---|---|---|---|---|---|---|---|
| CAOV3 | 0.5 | ++ | − | Amp, High | + | − | loss of heterozygosity |
| OVCAR3 | 2.7 | ++ | + | Unamp, Low | + | − | |
| SK-OV3 | 5.6 | + | ++ | | − | + | |
| SW626 | 3.6 | + | / | | + | / | |

As a result, it was confirmed that PHI-101 exhibited better inhibitory activity against the TP53-mutant ovarian cancer cell lines, indicating the selective inhibitory activity of PHI-101 against the P53-mutant ovarian cancer cell lines.

Example 3. Evaluation of Inhibitory Activity of Combination of Anticancer Agents Against Ovarian Cancer Cell Lines 90 μl of each ovarian cancer cell line diluted in Example 1 was treated with 10 μl of a 1:2 serial dilution of PHI-101 to a final concentration of up to 100 μM, and incubated at 37° C. under 5% $CO_2$ for 1 hour, and then treated with cisplatin, paclitaxel or topotecan at the $IC_{50}$ concentration for each cell line. Next, each cell line was incubated at 37° under 5% $CO_2$ for 72 hours. The cells were counted using a Celltiter glo assay kit (Promega), and cell viability was calculated by expressing the cell count as a percentage relative to that of a control group not treated with the combination of the anticancer agents.

Figure 2:
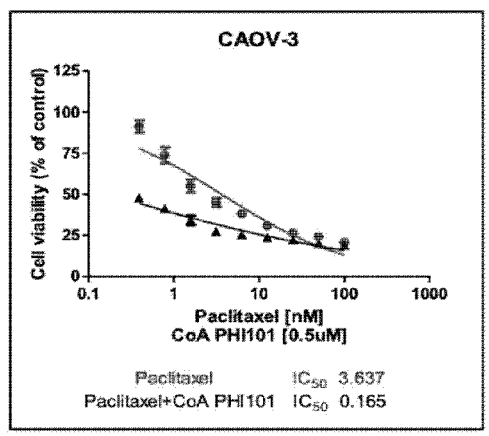
FIG. 2 depicts graphs showing the $IC_{50}$ values of paclitaxel and a combination of paclitaxel and PHI-101 against CAOV3 (A), OVCAR3 (B), SK-OV-3 (C) and SW626 (D) ovarian cell lines.
Figure 2:
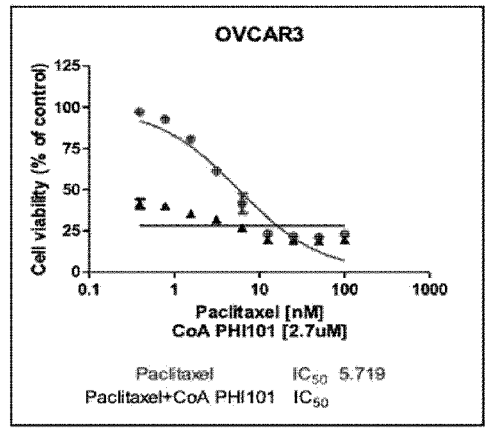
Figure 2:
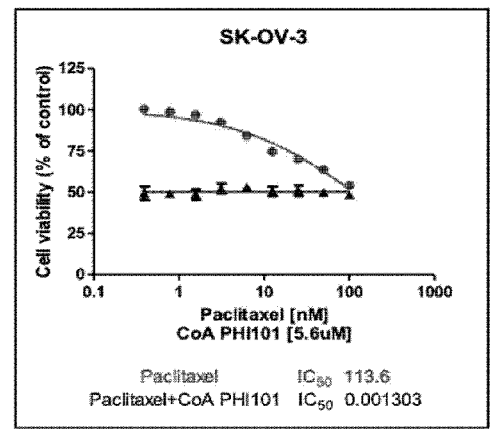
Figure 2:
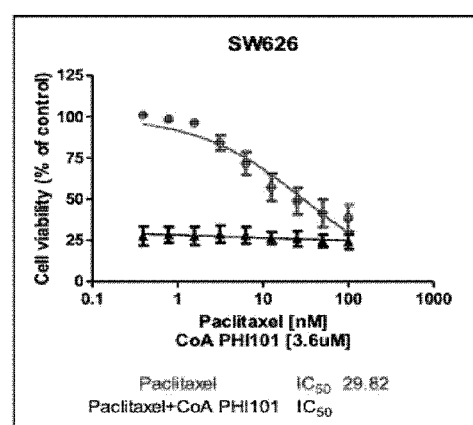
Figure 3:
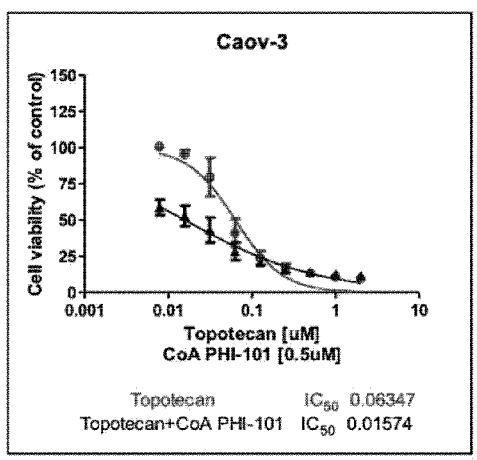
FIG. 3 depicts graphs showing the $IC_{50}$ values of topotecan and a combination of topotecan and PHI-101 against CAOV3 (A), OVCAR3 (B), SK-OV-3 (C) and SW626 (D) ovarian cell lines.
Figure 3:
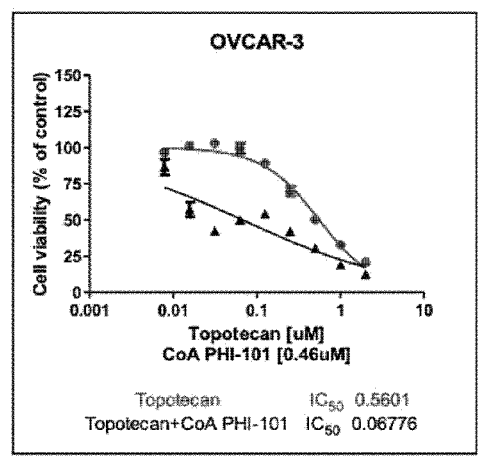
Figure 3:
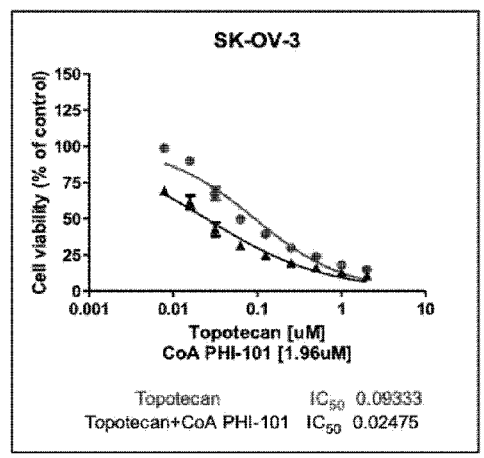
Figure 3:
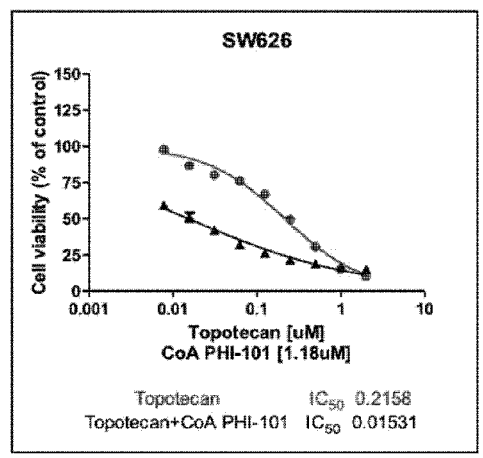

As a result of calculating the $IC_{50}$ by sigmoidal curve fitting using the PRIZM software, it was confirmed that the use of PHI-101 in combination with cisplatin (FIG. 1), paclitaxel (FIG. 2) or topotecan (FIG. 3) showed a lower $IC_{50}$ than the use of the anticancer agents alone, indicating that the use of PHI-101 in combination with the existing anticancer agents against ovarian cancer cell lines exhibits excellent effects (Table 3).

TABLE 3

| Ovarian cancer cell line | IC$_{50}$ (µM) | | | | | | |
|---|---|---|---|---|---|---|---|
| | PHI-101 | Cisplatin | PHI-101 | Paclitaxel | PHI-101 | Topotecan | PHI-101 |
| CAOV3 | 0.5 | 3.5 | 0.096 | 3.6 | 0.17 | 3.9 | 0.016 |
| OVCAR3 | 2.7 | 4.4 | 0.005 | 5.7 | — | 8.3 | 0.068 |
| SK-OV3 | 5.6 | 12.3 | 0.482 | 113.6 | — | 3.7 | 0.025 |
| SW626 | 3.6 | 8.0 | — | 29.8 | — | 14.4 | 0.015 |

Example 4. Confirmation of Synergistic Effect of PHI-101 and Olaparib Against Ovarian Cancer Cell Lines

4-1. Establishment of Treatment Starting Concentrations of PHI-101 and Olaparib In order to establish the concentrations of PHI-101 and olaparib which are in an integer ratio in the combination index experiment, based on the IC$_{50}$ value of olaparib relative to the relatively low IC$_{50}$ value (1×) of PHI-101, the integer ratio between PHI-101 and olaparib was obtained as shown in Table 4 below.

TABLE 4

| IC$_{50}$ | CAOV3 | OVCAR3 | SK-OV3 | SW626 |
|---|---|---|---|---|
| PHI-101 | 0.5235 (×1) | 2.757 (×1) | 5.604 (×1) | 3.636 (×1) |
| Olaparib | 29.39 (×56) | 94.4 (×34) | 162.6 (×29) | 147.2 (×40) |

As shown in Table 5 below, the treatment starting concentration was determined as a concentration that was 23 times the IC$_{50}$ concentration so that the IC$_{50}$ value could lie in the middle in the dose concentration gradient.

TABLE 5

| | Treatment starting concentration (µM) | | | |
|---|---|---|---|---|
| | CAOV3 | OVCAR3 | SK-OV3 | SW626 |
| PHI-101 | 4 | 22 | 45 | 29 |
| Olaparib | 224 | 748 | 1305 | 1160 |

4-2. Preparation of Serial Dilutions of PHI-101 and Olaparib

Each of PHI-101 and olaparib was prepared as a 10× solution by mixing each stock and medium at the ratio shown in Table 6 below.

TABLE 6

| Ovarian cancer cell line | Substance | 10× solution | | |
|---|---|---|---|---|
| | | Concentration | Mixing ratio Stock | Medium |
| CAOV3 | PHI-101 | 40 µM | 10 mM stock 1.2 mM | DMEM 298.8 µl |
| | Olaparib | 2.24 mM | 50 mM stock 13.45 mM | DMEM 286.55 µl |
| OVCAR3 | PHI-101 | 220 µM | 50 mM stock 1.32 mM | RPMI 298.68 µl |
| | Olaparib | 7.48 mM | 50 mM stock 44.9 mM | RPMI 255.1 µl |
| SK-OV3 | PHI-101 | 450 µM | 50 mM stock 2.7 mM | RPMI 297.3 µl |
| | Olaparib | 13.05 mM | 50 mM stock 78.3 mM | RPMI 221.7 µl |

Figure 5:
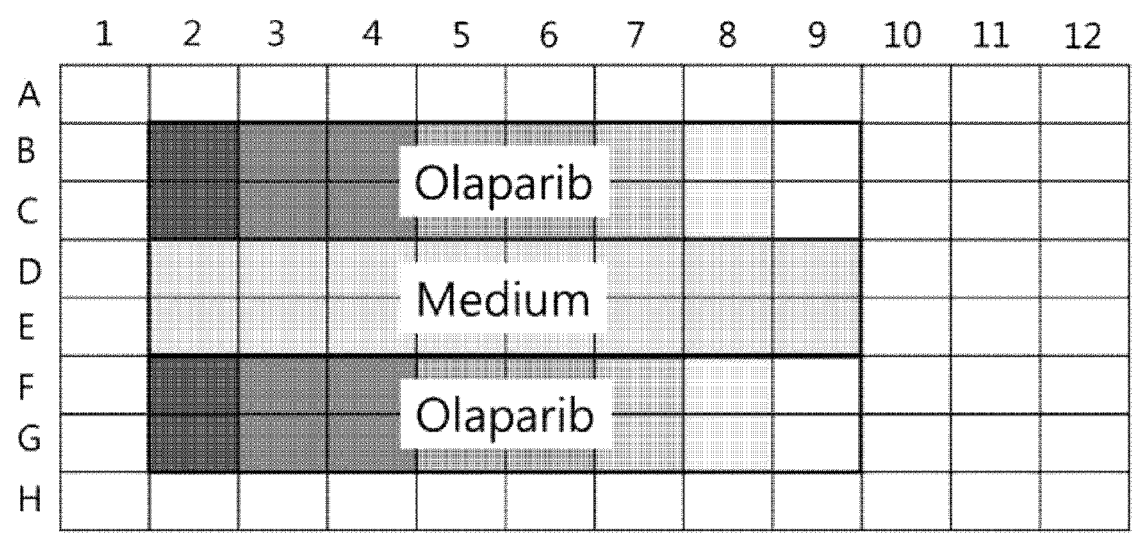

Each prepared 10× solution was serially diluted at 1:2 in each of six E-tubes, each containing 150 µl of medium. Then, a PHI-101 96-well plate (FIG. 4) and an olaparib 96-well plate (FIG. 5) were prepared separately, and 30 µl of the serially diluted PHI-101 or olaparib was dispensed into each well of the corresponding plate. 30 µl of medium was dispensed into each well not containing the substance.

4-3. Treatment with Serial Dilutions of PHI-101 and Olaparib

Figure 6:
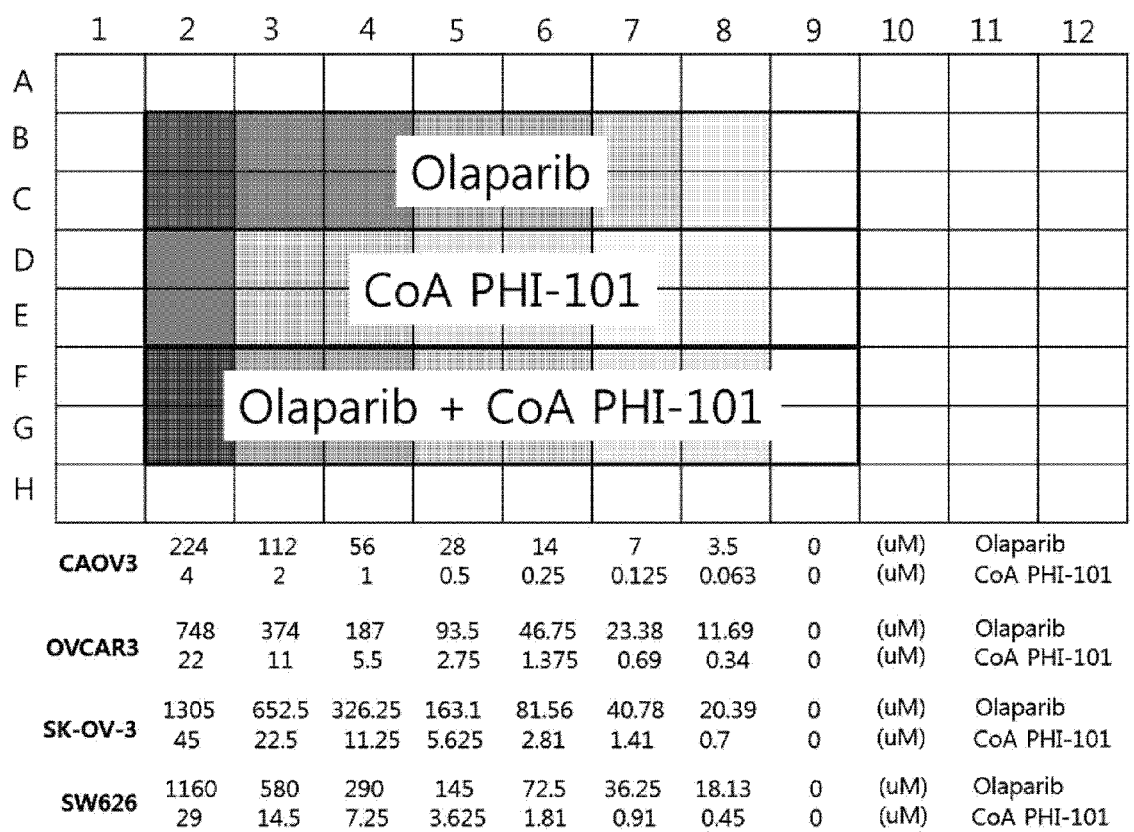
FIG. 6 shows the treatment arrangements and concentrations of PHI-101 and olaparib serial dilutions.

As shown in FIG. 6, 10 µl of each of serial dilutions of the PHI-101 plate and olaparib plate prepared in Example 4-2 was dispensed into each corresponding well of a 96-well plates, into which 80 µl of each ovarian cancer cell line diluted in Example 1 was dispensed, using JANUS to a final volume of 100 µl. Then, each well was incubated at 37° C. under 5% CO$_2$ for 72 hours, and each experiment was performed in triplicate.

4-4. Evaluation of Synergism Between PHI-101 and Olaparib

For each ovarian cancer cell line treated with the serial dilution in Example 4-3, the cells were counted using a Celltiter glo assay kit, and cell viability was calculated by expressing the cell count as a percentage relative to that of a control group not treated with PHI-101 and olaparib, and then IC$_{50}$ was calculated by sigmoidal curve fitting using the PRIZM software.

Figure 7:
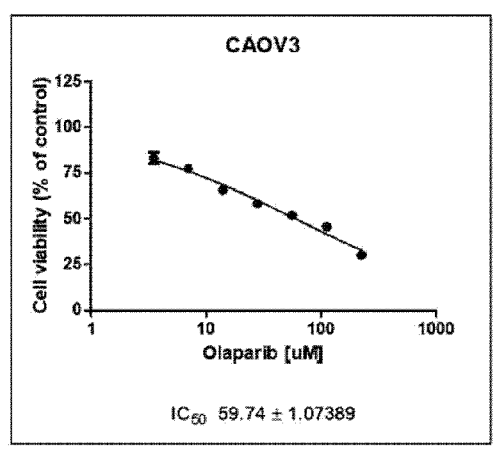
FIG. 7 depicts graphs showing the ICH values of olaparib (A), PHI-101 (B), and a combination of olaparib and PHI-101 (C) against the CAOV3 ovarian cancer cell line.
Figure 7:
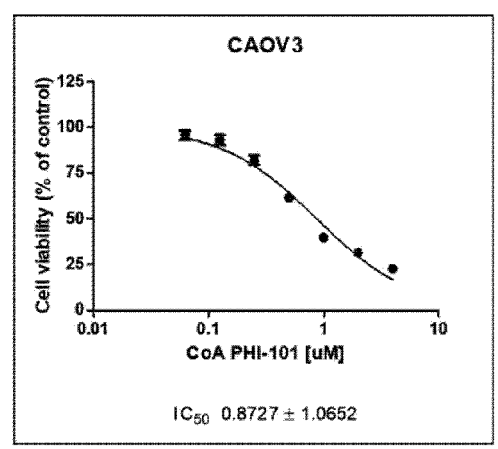
Figure 7:
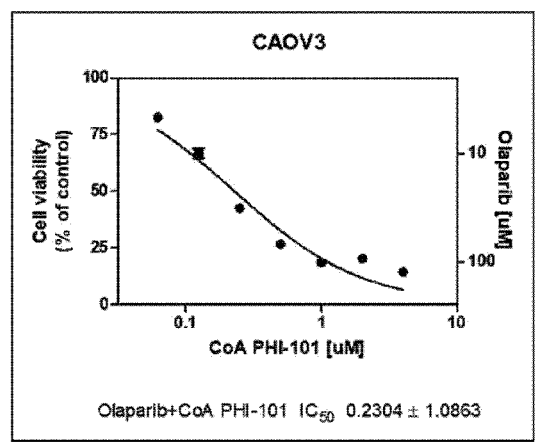
Figure 8:
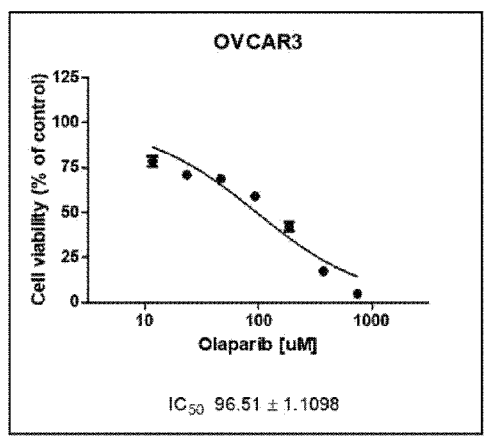
FIG. 8 depicts graphs showing the ICH values of olaparib (A), PHI-101 (B), and a combination of olaparib and PHI-101 (C) against the OVCAR3 ovarian cancer cell line.
Figure 8:
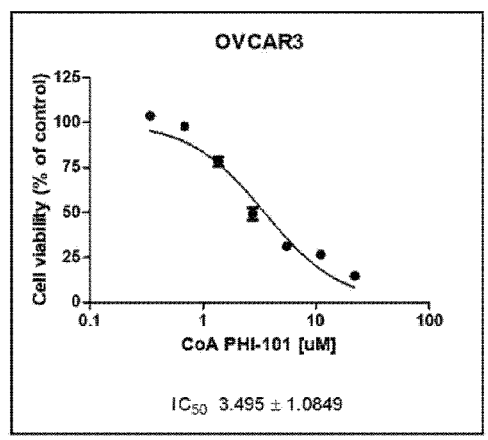
Figure 8:
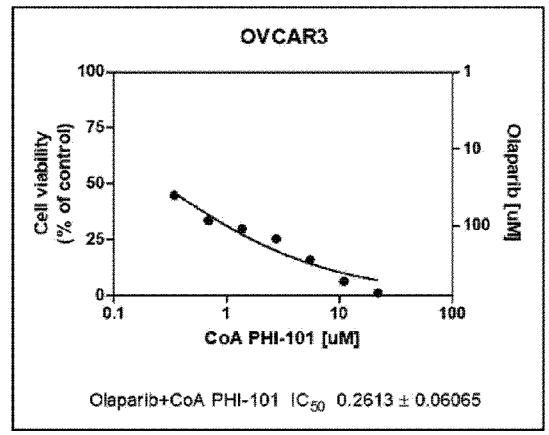
Figure 9:
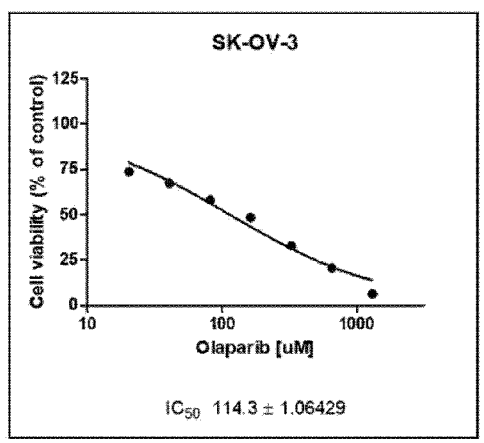
FIG. 9 depicts graphs showing the ICH values of olaparib (A), PHI-101 (B), and a combination of olaparib and PHI-101 (C) against the SK-OV3 ovarian cancer cell line.
Figure 9:
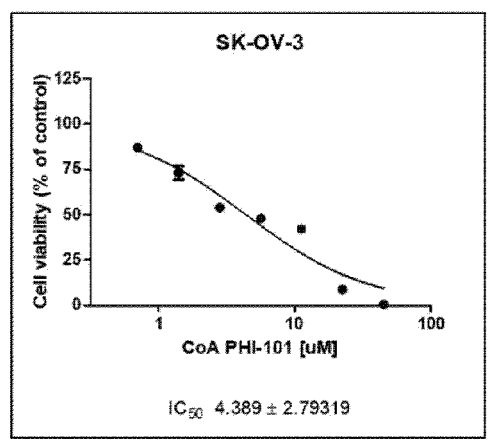
Figure 9:
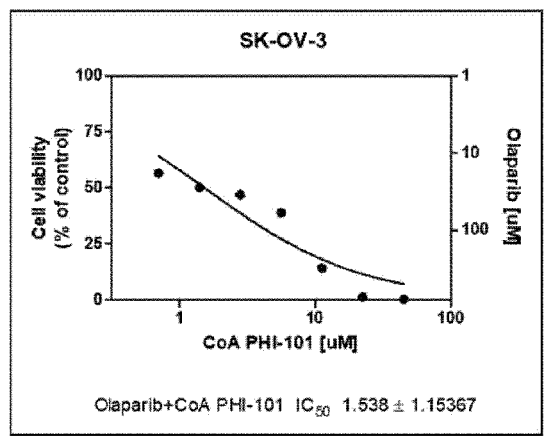

As a result, it was confirmed that the IC$_{50}$ values of PHI-101, olaparib, and a combination of PHI-101 and olaparib for CAOV3 (FIG. 7), OVCAR3 (FIG. 8), and SK-OV3 (FIG. 9) ovarian cancer lines were as shown in Table 7 below.

TABLE 7

| Ovarian cancer cell line | IC$_{50}$ | | |
|---|---|---|---|
| | PHI-101 | Olaparib | PHI-101 + Olaparib |
| CAOV3 | 0.8727 | 59.74 | 0.2304 |
| OVCAR3 | 3.495 | 96.51 | 0.2613 |
| SK-OV3 | 4.389 | 114.1 | 1.538 |

Next, using the CalcuSyn software and based on the Combination Index (CI) shown in Table 8, the CI for each ovarian cancer cell line depending on the treatment concentrations of PHI-101 and olaparib was calculated, and whether there was synergism between the substances was evaluated.

TABLE 8

| Range of CI | Symbol | Description |
|---|---|---|
| <0.1 | +++++ | Very strong synergism |
| 0.1-0.3 | ++++ | Strong synergism |
| 0.3-0.7 | +++ | Synergism |
| 0.7-0.85 | ++ | Moderate synergism |
| 0.85-0.90 | + | Slight synergism |
| 0.90-1.10 | ± | Nearly additive |
| 1.10-1.20 | - | Slight antagonism |
| 1.20-1.45 | -- | Moderate antagonism |
| 1.45-3.3 | --- | Antagonism |
| 3.3-10 | ---- | Strong antagonism |
| >10 | ----- | Very strong antagonism |

Figure 10:
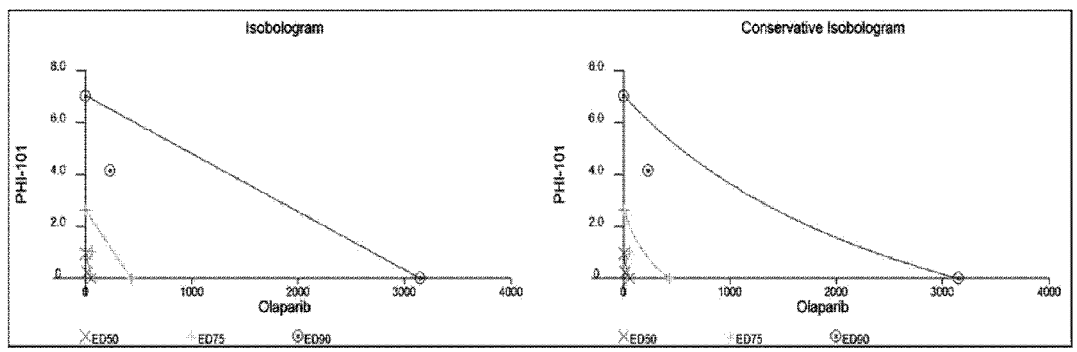
FIG. 10 depicts graphs showing the synergistic effect of a combination of olaparib and PHI-101 against the CAOV3 ovarian cancer cell line.
Figure 10:
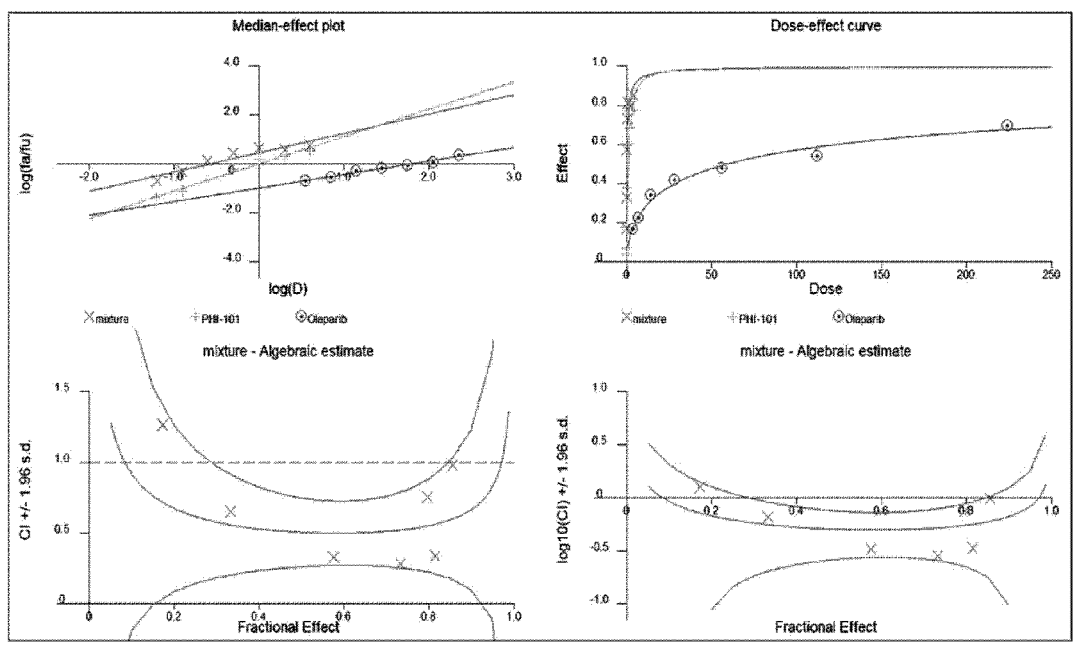
Figure 11:
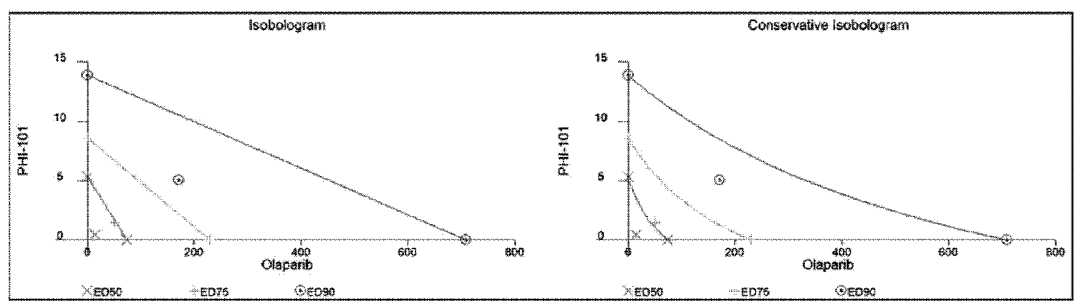
FIG. 11 depicts graphs showing the synergistic effect of a combination of olaparib and PHI-101 against the OVCAR3 ovarian cancer cell line.
Figure 11:
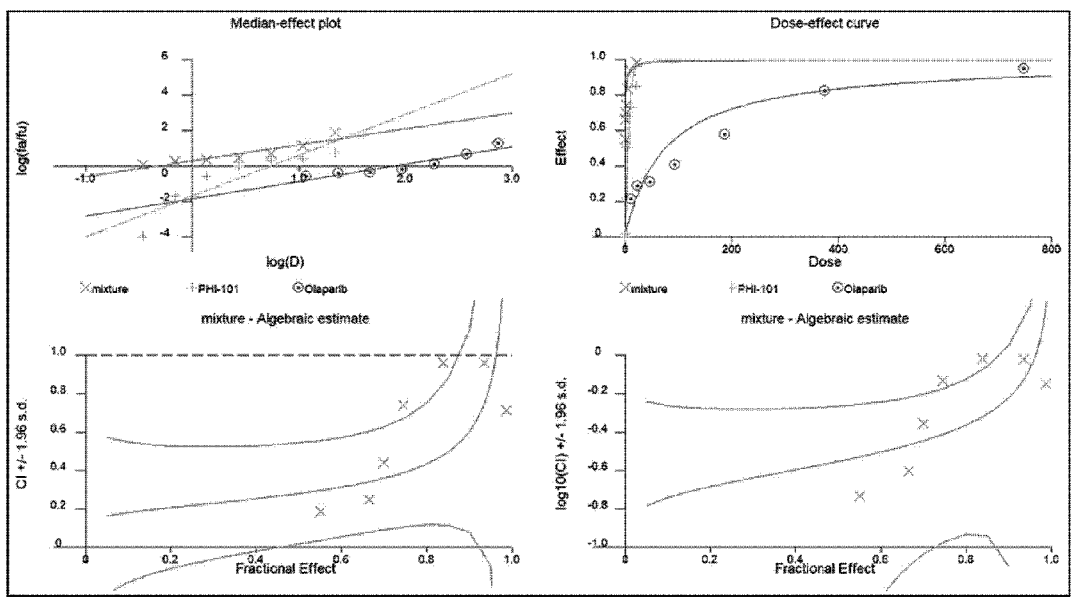
Figure 12:
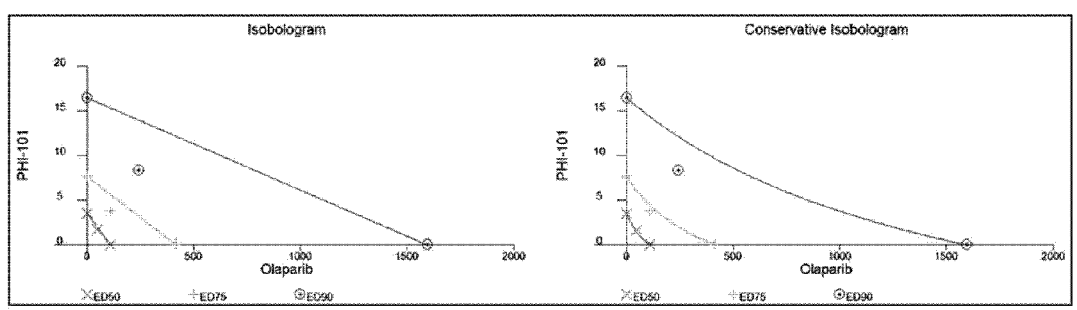
FIG. 12 depicts graphs showing the synergistic effect of a combination of olaparib and PHI-101 against the SK-OV3 ovarian cancer cell line.
Figure 12:
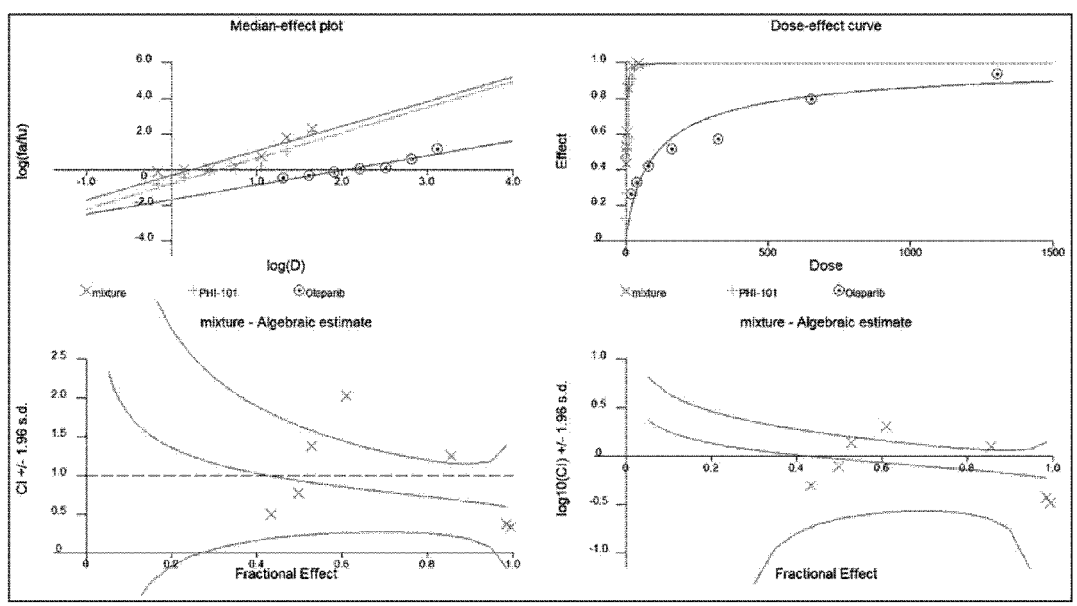

As a result, it was confirmed that the CI for CAOV3 was as shown in Table 9 below, and that there was synergism between CoA PHI-101 and olaparib in the entire concentration range except for the lowest concentration (FIG. 10). It was confirmed that the CI for OVCAR3 was as shown in Table 10 below, and that there was synergism between CoA PHI-101 and olaparib in the entire concentration range (FIG. 11). In addition, it was confirmed that the CI for SK-OV3 was as shown in Table 10, and that there was partial synergism between CoA PHI-101 and olaparib in the high concentration and low concentration ranges (FIG. 12).

TABLE 9

| CoA PHI-101 [uM] | Olaparib [uM] | MEAN | SD | N | CI | Symbol | Description |
|---|---|---|---|---|---|---|---|
| 4 | 224 | 14.4933 | 1.464023 | 6 | 0.983 | ± | Nearly additive |
| 2 | 112 | 20.33794 | 0.691246 | 6 | 0.757 | ++ | Moderate synergism |
| 1 | 56 | 18.61397 | 1.260451 | 6 | 0.337 | +++ | Synergism |
| 0.5 | 28 | 26.68044 | 1.384589 | 6 | 0.282 | ++++ | Strong synergism |
| 0.25 | 14 | 42.41976 | 1.606439 | 6 | 0.33 | +++ | Synergism |
| 0.125 | 7 | 66.74697 | 4.855919 | 6 | 0.655 | +++ | Synergism |
| 0.063 | 3.5 | 82.66504 | 1.514114 | 6 | 1.267 | -- | Moderate antagonism |
| 0 | 0 | 103.3429 | 2.84175 | 6 | | | |

TABLE 10

| CoA PHI-101 [uM] | Olaparib [uM] | MEAN | SD | N | CI | Symbol | Description |
|---|---|---|---|---|---|---|---|
| 22 | 748 | 1.170565 | 0.18243 | 6 | 0.715 | ++ | Moderate synergism |
| 11 | 374 | 6.415769 | 0.766374 | 6 | 0.962 | ± | Nearly additive |
| 5.5 | 187 | 16.099 | 0.868553 | 6 | 0.963 | ± | Nearly additive |
| 2.75 | 93.5 | 25.49289 | 1.298739 | 6 | 0.74 | ++ | Moderate synergism |
| 1.375 | 46.75 | 29.99805 | 2.380713 | 6 | 0.441 | +++ | Synergism |
| 0.688 | 23.375 | 33.50719 | 2.512548 | 6 | 0.251 | ++++ | Strong synergism |
| 0.344 | 11.688 | 44.87906 | 2.467262 | 6 | 0.186 | ++++ | Strong synergism |
| 0 | 0 | 101.2941 | 1.784185 | 6 | | | |

From these results, it was confirmed that PHI-101 exhibited synergism with olaparib, suggesting that it may be effectively used against ovarian cancer.

So far, the present invention has been described with reference to the embodiments. Those of ordinary skill in the art to which the present invention pertains will appreciate that the present invention may be embodied in modified forms without departing from the essential characteristics of the present invention. Therefore, the disclosed embodiments should be considered from an illustrative point of view, not from a restrictive point of view. The scope of the present invention is defined by the claims rather than the foregoing description, and all differences within the scope equivalent thereto should be construed as being included in the present invention.

What is claimed is:

1. A method of treating ovarian cancer, comprising a step of administering to an ovarian cancer patient, a pharmaceutical composition comprising a compound represented by the following Formula 1 or a pharmaceutically acceptable salt thereof:

[Formula 1]

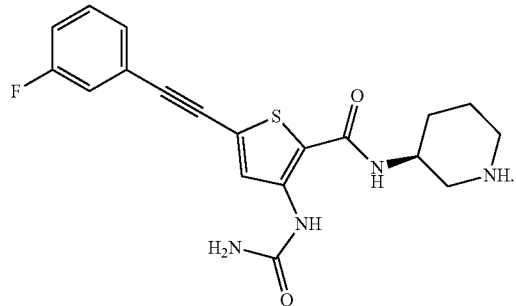

2. The method of claim 1, wherein the ovarian cancer is any one of TP53-mutant ovarian cancer, recurrent epithelial peritoneal or fallopian tube cancer, or high-grade serous ovarian cancer.

3. The method of claim 1, wherein the composition further comprises at least one anticancer agent selected from the group consisting of cisplatin, paclitaxel, and topotecan.

4. The method of claim 1, wherein the composition further comprises olaparib.

5. A method of ameliorating ovarian cancer, comprising a step of administering to an ovarian cancer patient, a food composition comprising a compound represented by the following Formula 1or a pharmaceutically acceptable salt thereof:

[Formula 1]
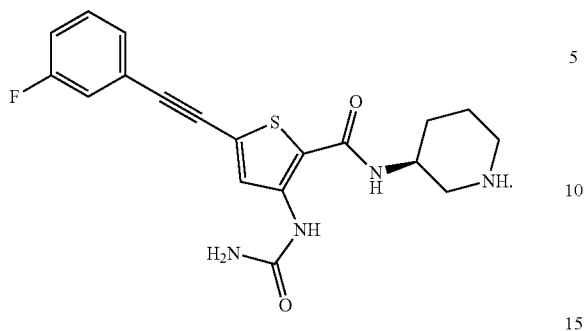
6. The method of claim 5, wherein the ovarian cancer is any one of TP53-mutant ovarian cancer, recurrent epithelial peritoneal or fallopian tube cancer, or high-grade serous ovarian cancer.
* * * * *